Figure 1:
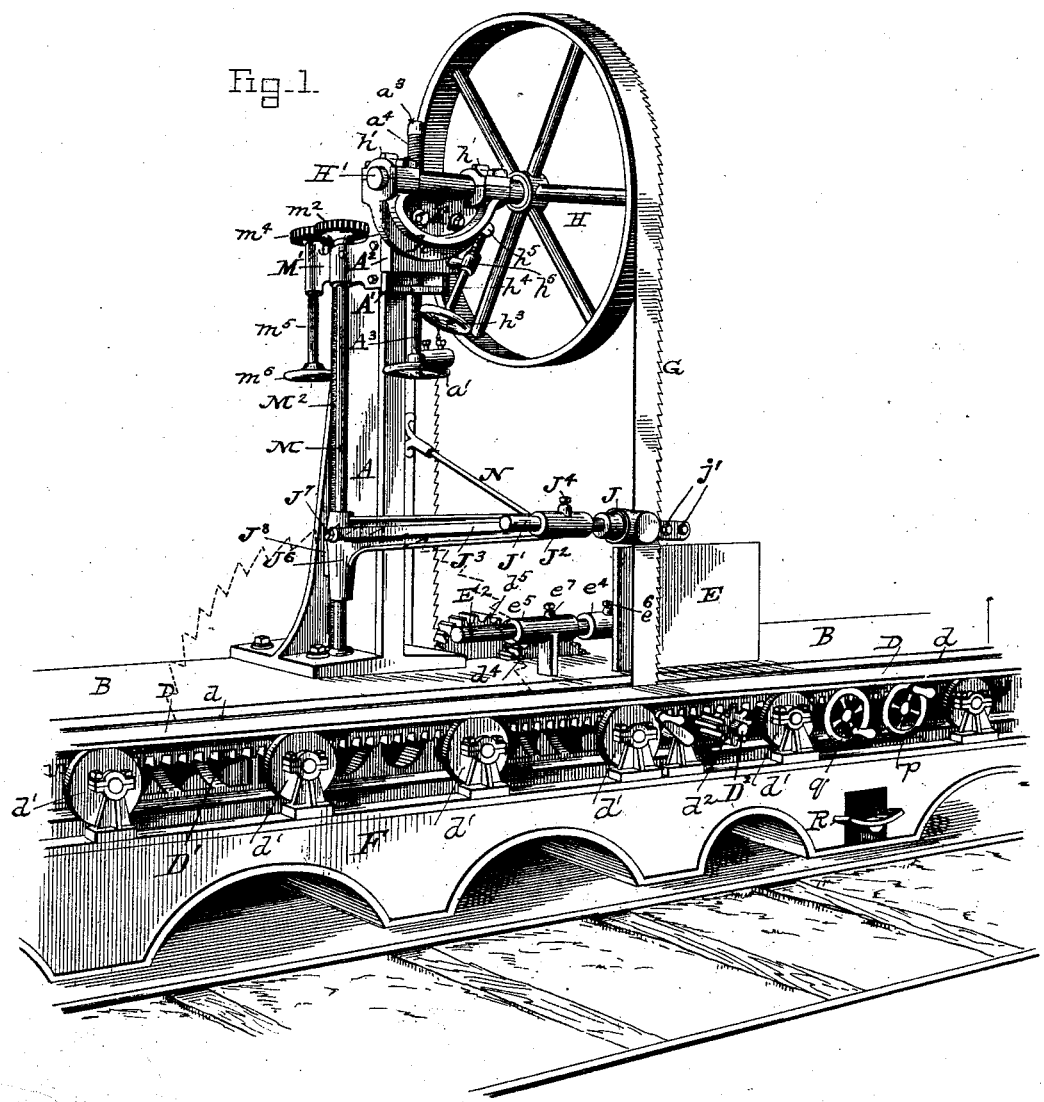

(No Model.) 7 Sheets—Sheet 1.

E. W. TURNER & J. REYNOLDS.
COMBINED BAND AND CIRCULAR SAW MILL.

No. 358,003. Patented Feb. 15, 1887.

(No Model.) 7 Sheets—Sheet 2.

E. W. TURNER & J. REYNOLDS.
COMBINED BAND AND CIRCULAR SAW MILL.

No. 358,003. Patented Feb. 15, 1887.

(No Model.) 7 Sheets—Sheet 5.

E. W. TURNER & J. REYNOLDS.
COMBINED BAND AND CIRCULAR SAW MILL.

No. 358,003. Patented Feb. 15, 1887.

Witnesses
James F. DuHamel
Walter S. Dodge

Edward W. Turner,
Jabez Reynolds,
Inventors
by Dodge & Son,
their Attys.

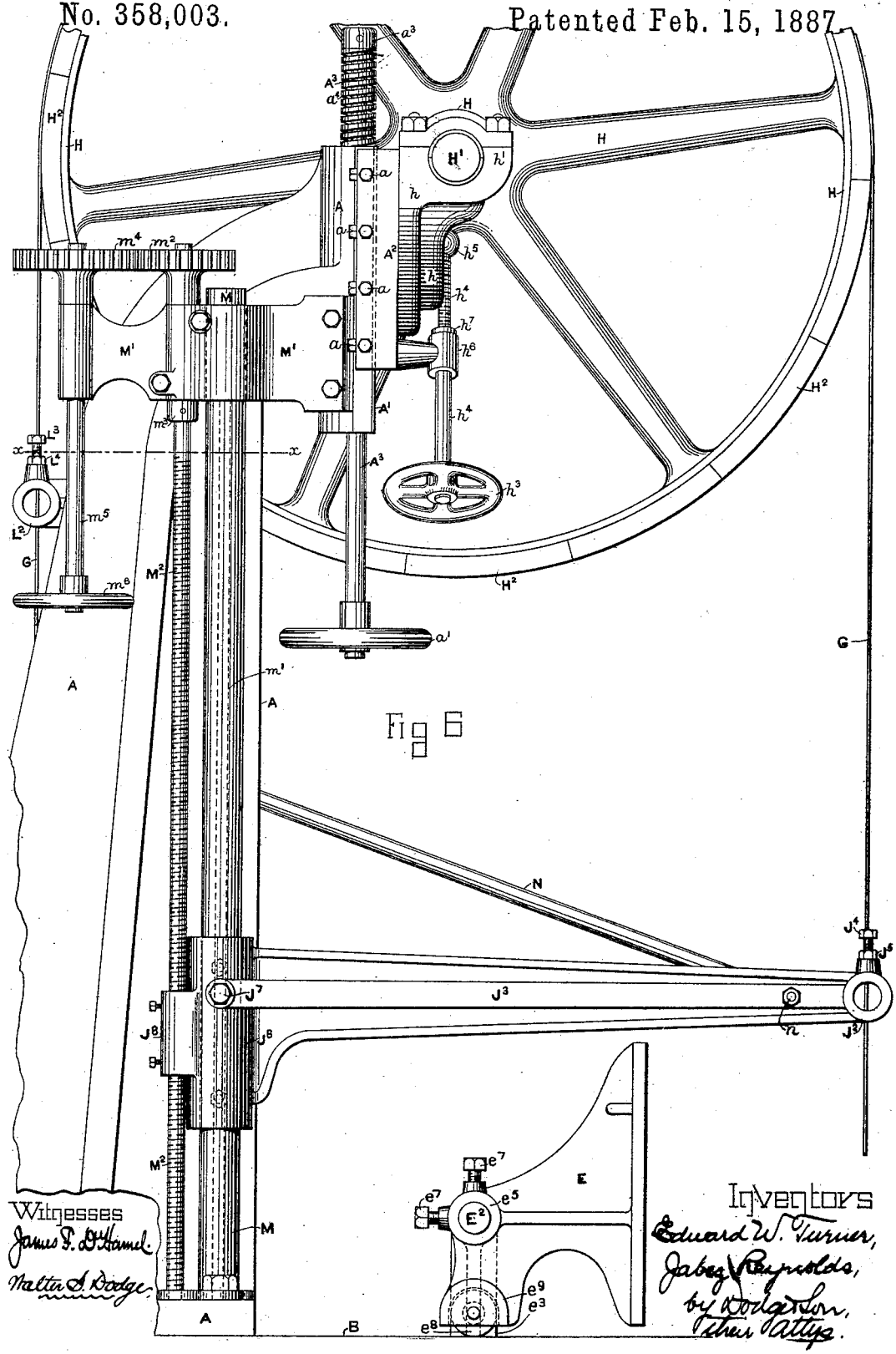

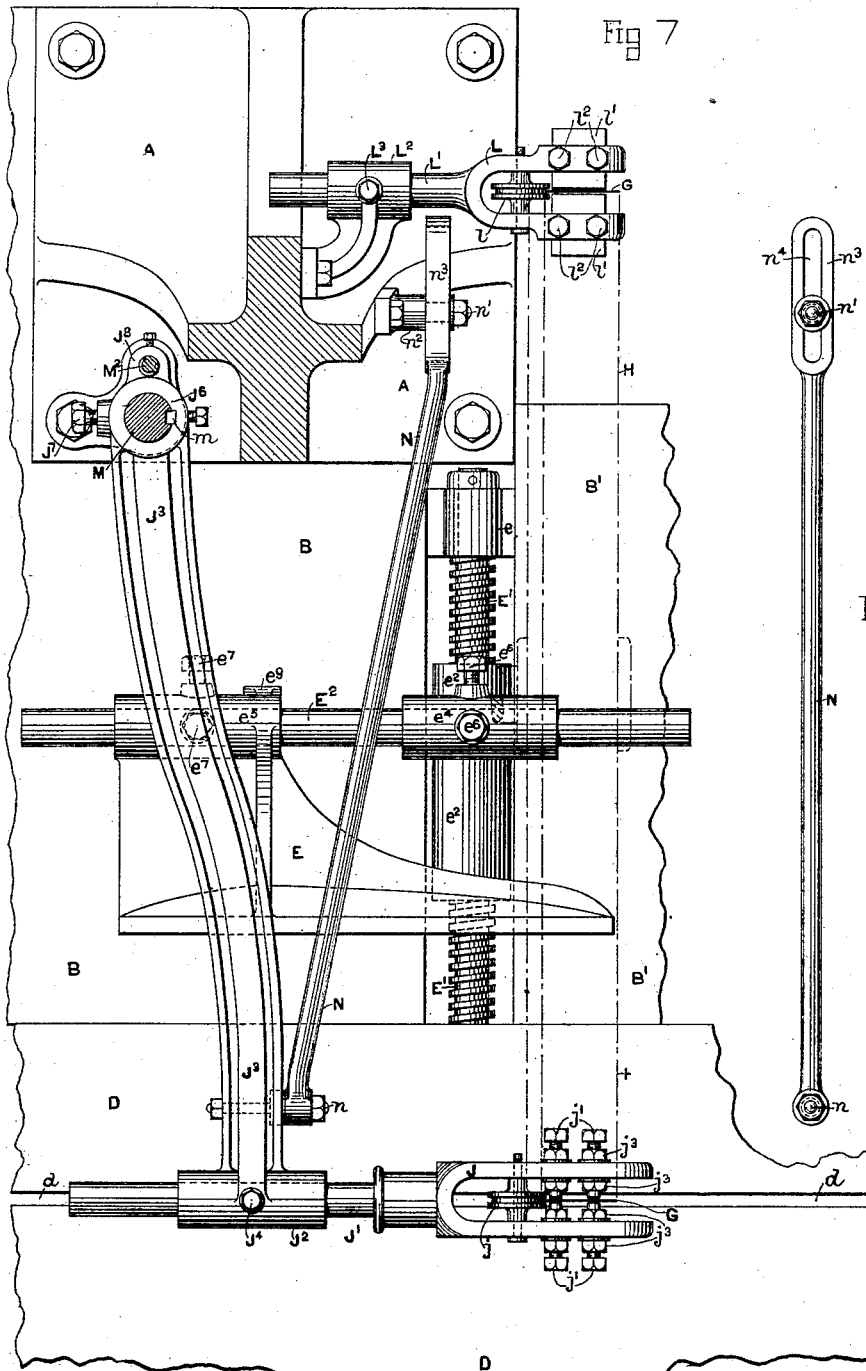

UNITED STATES PATENT OFFICE.

EDWARD WHITEHOUSE TURNER AND JABEZ REYNOLDS, OF BLOXWICH, COUNTY OF STAFFORD, ENGLAND.

COMBINED BAND AND CIRCULAR SAW MILL.

SPECIFICATION forming part of Letters Patent No. 358,003, dated February 15, 1887.

Application filed April 12, 1886. Serial No. 198,594. (No model.) Patented in England November 19, 1884, No. 15,197.

*To all whom it may concern:*

Be it known that we, EDWARD WHITEHOUSE TURNER and JABEZ REYNOLDS, subjects of the Queen of Great Britain, both residing at Bloxwich, in the county of Stafford, in the Kingdom of England, have invented certain new and useful Improvements in Sawing-Machines, (for which we have received Letters Patent in England, dated November 19, 1884, No. 15,197,) of which the following is a specification.

Our invention consists in a combined band-saw and circular-saw machine or mill, and particularly in the construction and arrangement of the frame, arbors, pulleys, guides, &c., hereinafter set forth, by which we are enabled to use either saw at will, the two saws operating in the same plane, and consequently requiring but one rack-bench or log-carriage, one gage, &c., and needing no adjustment of these parts in changing from one saw to the other.

It is well known to those engaged or interested in the manufacture of lumber that, owing to its greater thickness, a circular saw cuts a wide kerf, and consequently wastes more lumber or produces fewer planks or boards from a given log than a band-saw, and, further, that lumber cut with a circular saw requires much deeper planing or dressing to remove the marks of the saw-teeth than lumber cut by a band-saw. On the other hand, a circular saw possesses advantages in the matter of speed and in other particulars, and is almost essential for slabbing, squaring logs, sawing crooked knotty lumber, and various other purposes.

In many shops and factories the cost of two separate machines, or two separate sets of machines—band and circular—with their necessary appliances, precludes their adoption. In other places lack of floor-space forbids their use, and in many cases the labor and delay of transferring a log from one machine to another renders it preferable to perform the work entirely on the one machine, even though it cannot be so satisfactorily or well done thereon as on another.

Our invention is designed to embody in one machine the two kinds of saws and their necessary driving devices in such manner that a change from one to the other may be made in a very short time, and without the need of any adjustment other than the removal of the circular saw from its arbor and the placing of the band-saw upon its carrying-wheels, or the removal of the band-saw from its wheels and the placing of the circular saw upon its arbor.

Figure 2:
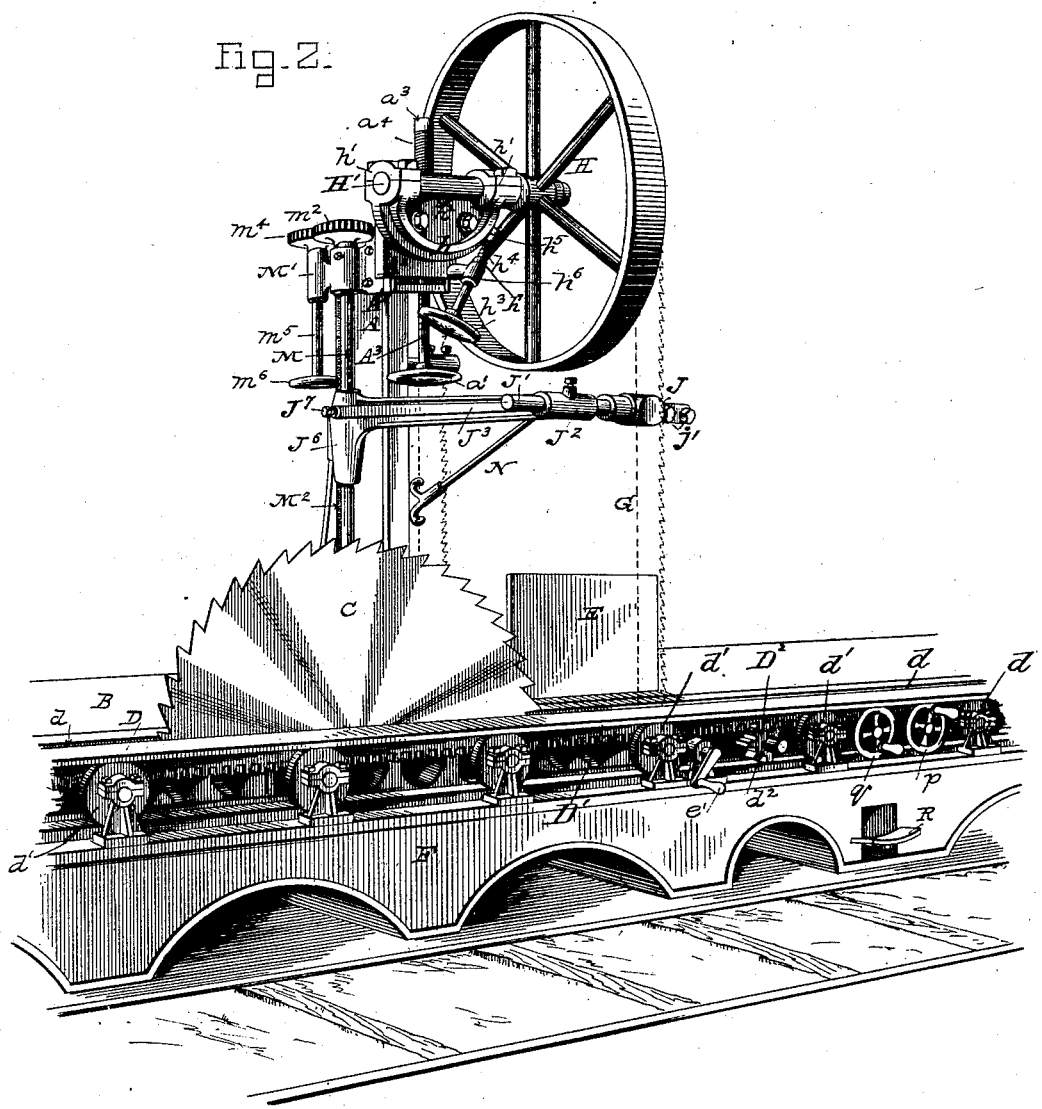
Figure 3:
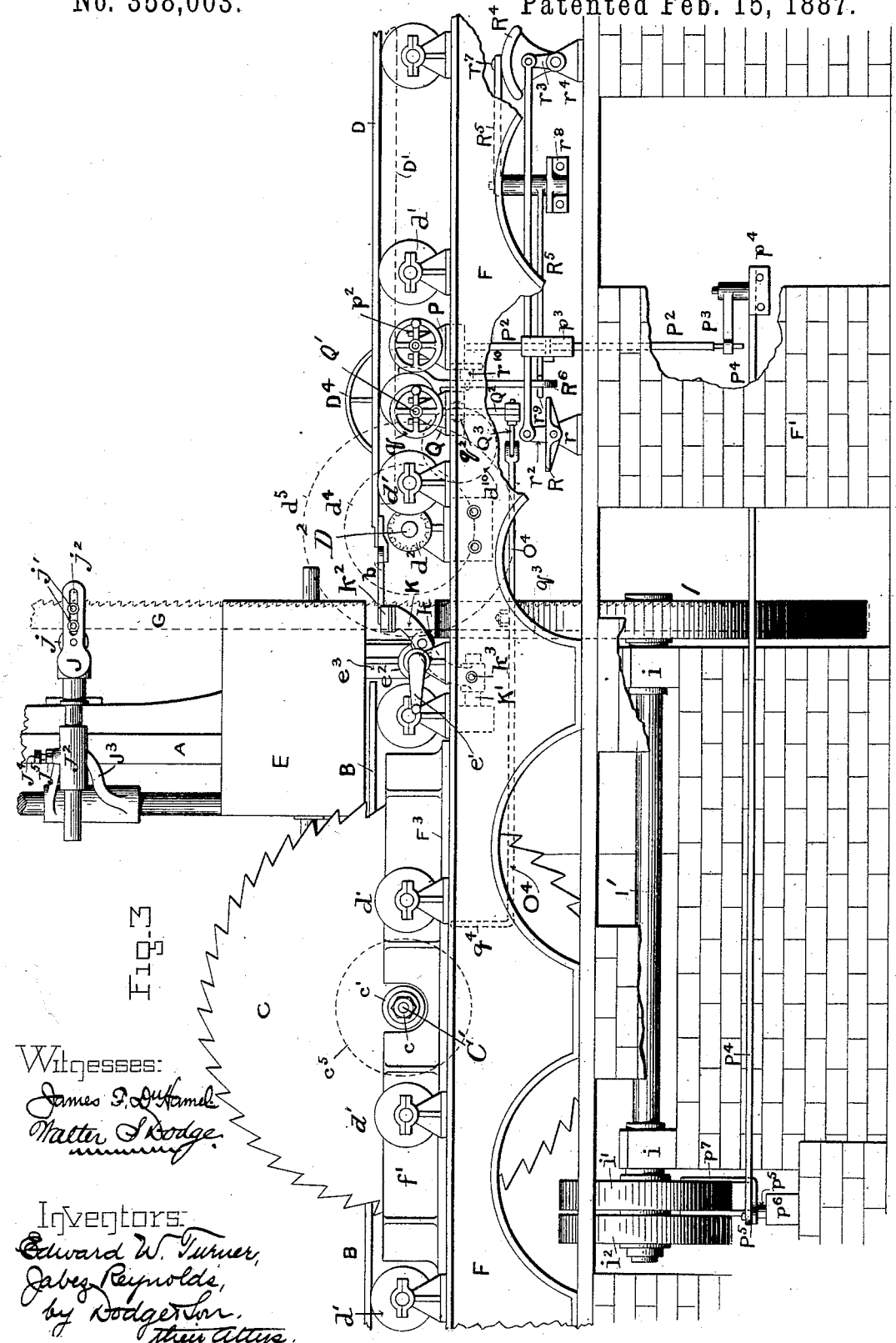
Figure 4:
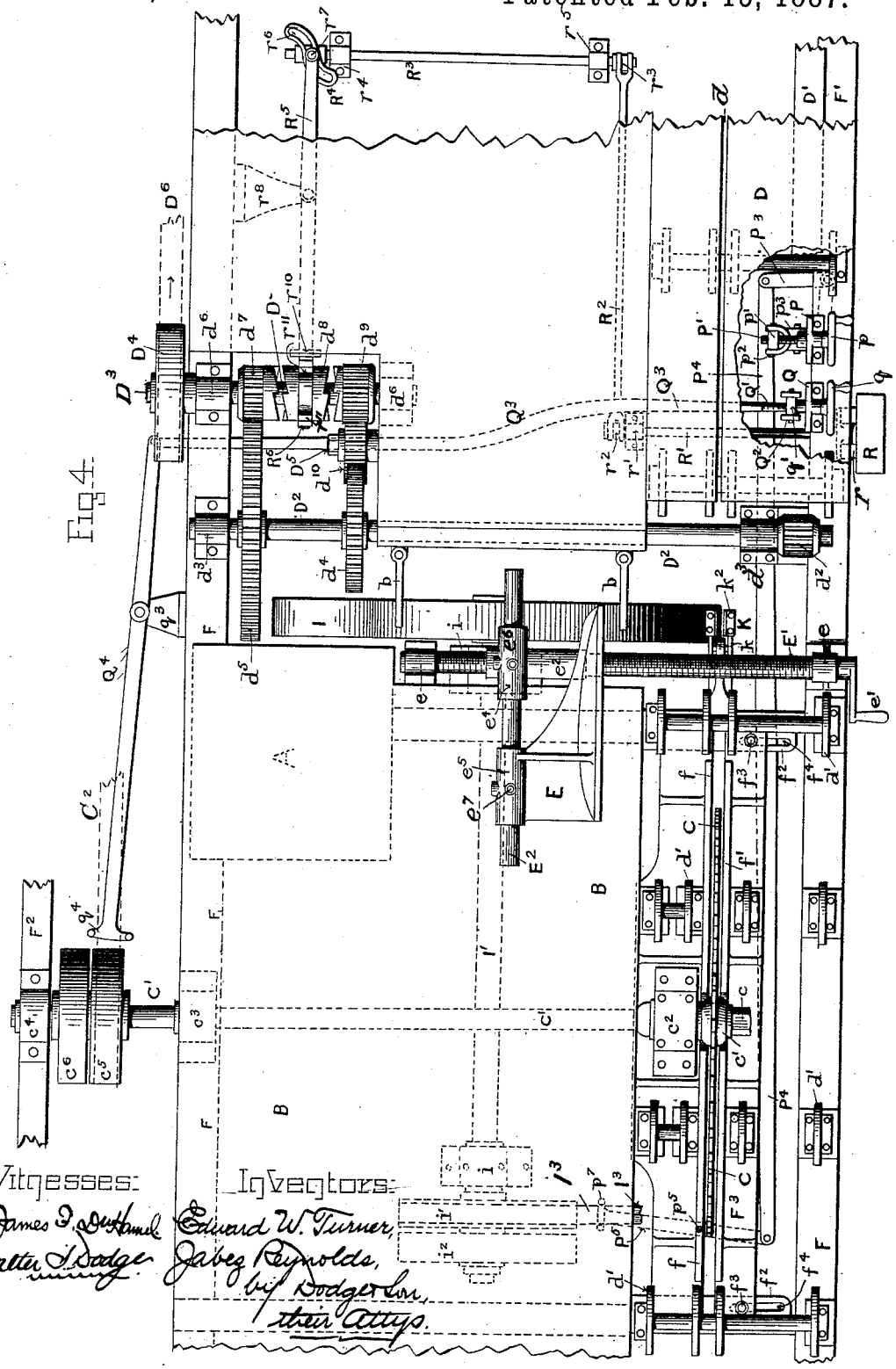
Figure 5:
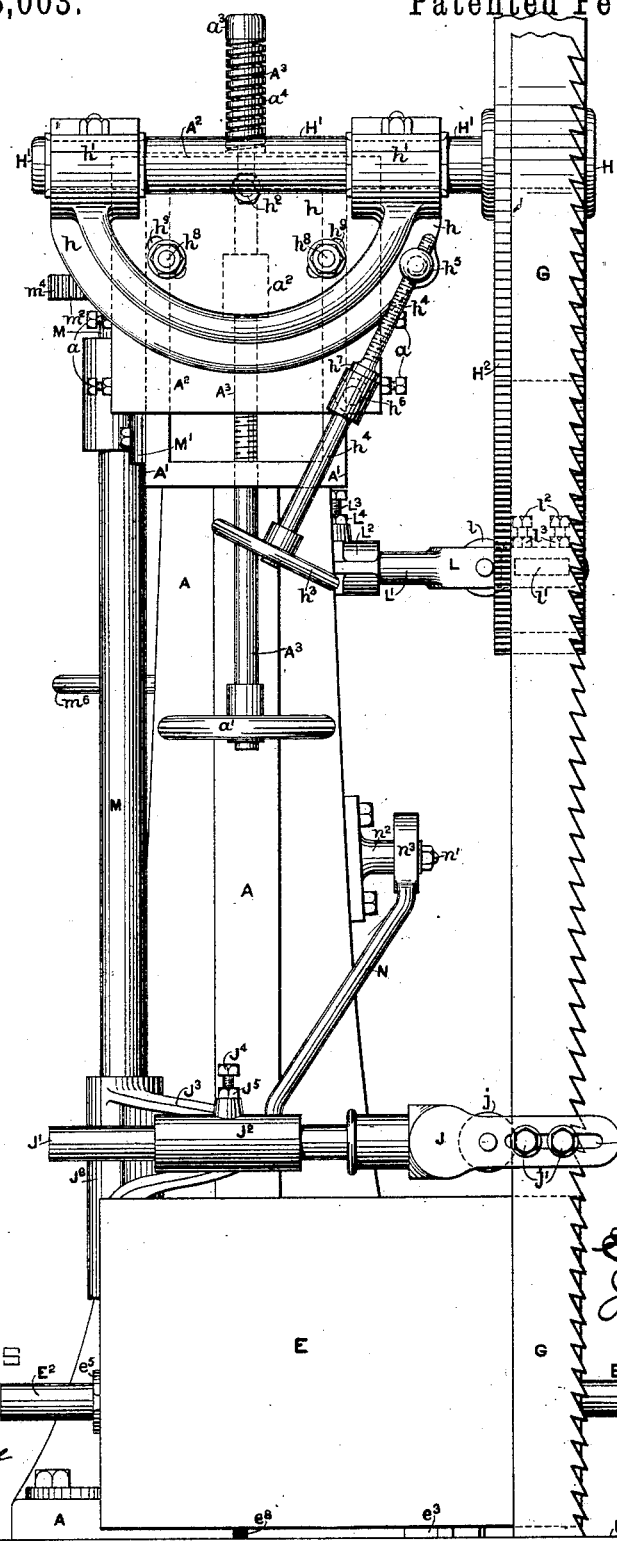

In the accompanying drawings, Figure 1 is a perspective view of the machine with the band-saw in position, the circular saw being removed; Fig. 2, a similar view, but showing the circular saw in position and the band-saw removed. Fig. 3 is a front elevation of the machine; Fig. 4, a top plan view with the pedestal or standard which carries the upper band-wheel removed; Fig. 5, a front elevation of said pedestal or standard, showing the mechanism for adjusting the upper band-wheel, the band-saw guide, and the gage; Fig. 6, a side elevation of the same; Fig. 7, a sectional elevation or plan view taken on the line $x\,x$, Fig. 6; Fig. 8, a detached view of the brace-rod, which steadies the saw-guide support.

In the drawings, A indicates a pillar or standard mounted and secured upon the bed B of the machine, which in turn is supported upon a suitable base-frame, F, resting upon firm foundations, as is customary.

C indicates a circular saw, which, when used, is secured upon an arbor, C', by means of a nut, $c$, and washer $c'$, said arbor being mounted in boxes $c^2$ and $c^3$ in the framing F, and, if desired, in a third box, $c^4$, supported by beam or wall $F^2$, as shown in Figs. 3 and 4.

The arbor C' is provided with fast and loose pulleys $c^5$ and $c^6$ to receive a driving-belt, $C^2$, which will transmit motion to the arbor from any convenient source.

That portion of frame F on which box or bearing $c^2$ rests is made L-shaped, with an upwardly-projecting flange, $f$, the top edge of which is slightly below the level of the under side of the rack-bench D. On the front side of the saw is a loose but similar L-shaped girder, $F^3$, having a flange, $f'$, as shown in Fig. 4. The saw C works between the flanges $f$ and $f'$. The girder $F^3$ slides upon the projecting pieces $f^2$, and is held in position by the bolts $f^3$, passing through its ends and through slots $f^4$ in the projecting pieces $f^2$. To remove the saw, bolts $f^3 f^3$ are loosened, girder $F^3$ slid forward, nut $c$ and washer $c'$ taken off, and saw C lifted out.

The position of the circular saw C upon its arbor must be such as to coincide with the narrow slit or opening $d$ formed for it in the rack-bench D, if such rack-bench be used; or, if the more common saw-mill carriage of American mills be used, then the carriage will be arranged to travel with the noses or forward ends of the head-blocks thereof close to the saw, as is customary, it being of course understood that the rack-bench is merely one form of saw-mill carriage, and a form more generally used in England than in the United States. Both the American and the English types serve to support and hold the log and to carry it to and past the saw, and they differ in no essential particular except that in one the sawing is done entirely outside or beyond the edge of the carriage, while in the other the line of cut falls within the carriage or rack-bench.

The rack-bench D here shown is of ordinary construction, having a slot, $d$, through which either saw works, and being provided on the under side with a rack, D′, as shown in Figs. 1, 2, and 3.

The rack-bench or carriage D is carried on guide-rollers $d'$, Figs. 1, 2, 3, and 4, in the usual manner; but those nearest the saw C are somewhat smaller than the others, as the framework F and $F^3$, which supports them, stands rather higher than the rest of frame F. Into the rack D′ there gears a pinion, $d^2$, Figs. 1 and 2, keyed on the end of shaft $D^2$, which is carried by brackets $d^3 d^3$. On shaft $D^2$ there are also fixed the spur-wheels $d^4 d^5$. Parallel to shaft $D^2$ is a short shaft, $D^3$, Fig. 4, working in bearings in $d^6 d^6$, and provided with a pulley, $D^4$, a pinion, $d^7$, which gears into $d^5$, a sliding reversing-clutch, $d^8$, of ordinary construction, and a second pinion, $d^9$. Below shafts $D^2$ and $D^3$ is a stud, $D^5$, which carries an intermediate wheel, $d^{10}$, working loose thereon and gearing into pinions $d^4$ and $d^9$. A belt, $D^6$, gives motion to pulley $D^4$. The forward and slow motion of the rack-bench D is obtained from $D^4$ through clutch $d^8$ and pinions $d^7$, $d^5$, and $d^2$. The backward and quick motion is transmitted through clutch $d^8$ and pinions $d^9$, $d^{10}$, $d^4$, and $d^2$.

The pillar or standard A, before mentioned, is formed at its upper end with an overhanging portion, upon the upright front face of which are vertical ways or guiding-ribs A′ of V shape in cross-section, to form a bearing-surface for a sliding head or plate, $A^2$, to which is attached a bracket, $h$, having bearings $h' h'$, in which is journaled a shaft, H′, bearing a band-wheel or saw-carrying wheel, H. The sliding head or plate $A^2$ is held in position against standard A by any usual means—such, for instance, as used in slide-rests—and is tightened up, to compensate for wear, by set-screws $a\ a\ a$, as shown in Figs. 5 and 6.

To move the head or plate $A^2$ vertically, a threaded vertical spindle or screw, $A^3$, is provided, bearing at its lower end a hand-wheel, $a'$, by which to turn it. This spindle passes through bearings in the pillar or standard A, which serve to maintain it in position, but which in no way interfere with the vertical or longitudinal movement of the spindle, which also passes through a threaded opening or nut, $a^2$, on the back of the sliding head or block $A^2$, and finally through a powerful coiled spring, $a^4$, the lower end of which rests firmly upon the top of pillar or chamber A, as shown in Figs. 1, 2, 5, and 6.

Above the upper end of the spring $a^4$, and resting thereon, is a collar or head, $a^3$, secured to or formed upon the upper end of spindle $A^3$, this collar serving to support the spindle, the sliding head $A^2$, the bracket $h$, shaft H′, and band-saw pulley H, and to afford the requisite tension for the band-saw G, which passes over said pulley H, and thence down to and about a driving band-wheel, I, secured upon a shaft, I′, running in boxes or bearings $i\ i$ in the frame F below the bed or platform B, as indicated in Figs. 3 and 4. Under this arrangement of parts the spring serves as a means of giving the necessary strain to the band-saw G, and at the same time precludes the possibility of exceeding a predetermined strain thereon, the limit being the amount of force required to compress the spring. Thus, if it be desired to strain the saw, the screw or spindle $A^3$ is turned in the proper direction to cause head or plate $A^2$ to rise, carrying with it the bracket $h$, shaft H′, and pulley H, the spindle having no longitudinal motion at such time, but merely turning in its bearings in post A, and on its supporting-collar $a^3$.

When the strain upon the saw exceeds the strength or sustaining force of the spring $a^4$, said spring will be compressed, and, instead of the head or plate $A^2$ and its attendant parts being further lifted, the spindle $A^3$ and spring $a^4$ will descend without further materially affecting the tension of the saw. This is a highly important provision, as it in a great measure overcomes the hitherto frequent breakage of saws, which can never be repaired to good advantage, it being now customary to make such saws without weld or joint. The spring also acts as a buffer in case of sudden strain or jerk upon the saw, such as is produced by striking a knot or sliver.

For the purpose of preventing friction on the back of the saw, and in order that it may lie fair upon the pulleys or receive a little more strain on the front or cutting-edge than on the rear edge, the bracket $h$ is pivoted to $A^2$ at $h^2$, Fig. 5, thus enabling the axis of wheel H to be adjusted in a vertical direction, whereby the front edge of the wheel may be brought level with or slightly above the rear edge. To effect this adjustment with ease and accuracy, and to retain the bracket $h$ at any desired adjustment, we provide a screw-stem or spindle, $h^4$, furnished with a hand-wheel, $h^3$. The body of the spindle $h^4$ is swiveled in a block or bracket, $h^6$, pivoted to the sliding head or plate $A^2$, and its threaded end enters a nut, $h^5$, pivoted to bracket $h$, as shown in Figs. 1, 2, 5, and 6. The spindle is prevented from moving longitudinally by means of a shoulder at one side and a collar, $h^7$, at the other side of block $h^6$, the whole constituting a swivel. When the bracket $h$ is adjusted to the position desired, it is clamped fast by bolts $h^8$ passing through slots $h^9$, as indicated in Fig. 5. The shaft $I'$ carries, in addition to the band-wheel $I$, fast and loose pulleys $i'$ and $i^2$, Figs. 3 and 4.

Upon reference to Figs. 3 and 4, it will be seen that the belts $I^3$ and $C^2$ and the clutch $d^8$ are all worked from the front of the machine, as follows: The bracket P carries a small horizontal spindle, $P'$, the outside end of which is fitted with a hand-wheel, $p$, and the inner end of which is screwed and engages with a swivel-nut, $p'$. The nut $p'$ is held in the forked end $p^2$ of the lever $P^2$, which is pivoted near its center in the bracket $p^3$. The other end of lever $P^2$ is reduced in diameter, and passes through a slot in the end of one arm of the bell-crank lever $P^3$, which is pivoted on the bracket $p^4$. The other arm of lever $P^3$ is pivoted to one end of the long connecting-rod $P^4$, the other end of rod $P^4$ being similarly jointed to the outer end of the lever $P^5$. $P^5$ is pivoted at $p^5$ on the beam or girder $p^6$, and at its inner end it is formed into the belt-fork $p^7$, through which the belt $I^3$ passes. By turning the hand-wheel $p$ motion is conveyed, through levers $P^2$ $P^3$, rod $P^4$, and lever $P^5$ to the fork $p^7$, and the belt $I^3$ drawn onto $i'$ or $i^2$, as required. The bracket Q is fitted with a spindle $Q'$, hand-wheel $q$, and nut $q'$; but the forked lever $Q^2$, which is pivoted in the bracket $q^2$, has its lower end jointed to the cranked rod $Q^3$. This rod need not be cranked, but is shown so for clearness in the drawings. Its farther end is jointed to one extremity of the lever $Q^4$, which is pivoted on the bracket $q^3$ and carries at its other end the belt-fork $q^4$, through which passes the belt $C^2$, as shown in Figs. 3 and 4. Thus by turning hand-wheel $q$ belt $C^2$ may be moved onto wheel $c^5$ or $c^6$, as required. The clutch $d^8$ is worked from the foot-treadle R, Figs. 1, 2, 3, and 4, which is keyed to one end of the spindle $R'$, carried by the brackets $r$ and $r'$. On the farther end of spindle $R'$ is keyed an upright arm, $r^2$, the top end of which is connected, by means of the rod $R^2$, with a similar upright arm, $r^3$, which is keyed on one end of the oscillating shaft $R^3$.

Shaft $R^3$ is carried in brackets $r^4 r^5$, and has keyed to its other end the upright quadrant-arm $R^4$, on the periphery of which is an S-shaped slot, $r^6$. (Shown in Figs. 3 and 4.) This slot $r^6$ receives a downward-projecting pin, $r^7$, which is fixed in one end of the oscillating lever $R^5$. As shown in Fig. 3, the lever $R^5$ is pivoted on the bracket $r^8$, and has its end $r^9$ reduced, so that it may pass through and work in a slot in the lower end of the clutch-lever $R^6$. The clutch-lever $R^6$ is pivoted on the bracket $r^{10}$, and is forked at its upper end, being fitted in the usual manner with cod-pieces $r^{11}$, which work in a groove in $d^8$. When the treadle R is worked, its oscillating movement is conveyed through spindle $R'$, arm $r^2$, rod $R^2$, arm $r^3$, and shaft $R^3$ to the quadrant $R^4$. This communicates a reciprocating motion to the pin $r^7$, which is obliged to follow the contour of the slot $r^6$, and so causes the lever $R^5$ to oscillate. It in turn imparts a similar motion to the clutch-lever $R^6$, throwing the clutch $d^8$ into gear with pinion $d^7$ or $d^9$, as required. The supports for all the above brackets are not shown; but they may be fixed in any convenient manner to the frame-work F or foundation $F'$.

The band-wheels H and I are advisably faced with wooden segments to give a good and slightly-elastic bearing for the saw G, the segments being slightly hollowed out or not, as preferred.

For the purpose of guiding the saw G, as well as giving it a means of resisting the forward movement of the timber which is being operated upon, three forked guide-brackets are provided. One, J, is placed immediately above the timber being sawed; a second, K, is fixed immediately below the rack-bench D, Figs. 3 and 4, while a third, L, Figs. 5 and 6, is supported by standard A near the top pulley, H, and serves to guide the saw at the back of the machine. Other guides may be added, if required. Each of the forks J K L is provided, respectively, with a guide-pulley, $j k l$, against which the back edge of the saw runs. The fork J is also provided with four set-screws, $j' j'$, two on each branch of the fork. They pass through slots $j^2$, being held in position by lock-nuts $j^3$, and are so adjusted as to barely touch the saw on either side, as in Fig. 7, thus preventing vibration in the saw. Instead of, and for the same purpose as the studs or set-screws $j'$, the fork L is fitted with pieces of hard wood, $l'$, which pass through slots similar to $j^2$, and are held firmly by set-screws $l^2$ and lock-nuts $l^3$, as shown in Fig. 5. The fork K is also provided with similar pieces of wood, $k^2$, which are L-shaped and bolted or screwed to the upper ends of the fork. Each of these forks may be adjusted horizontally to accommodate saws of various widths, and also to compensate for the wear of the guide-pulleys. The fork K slides upon a stud, $K'$, which is firmly fixed in the framing of the machine, and it is held in position by a set-screw, $k^3$. (Seen in Figs. 3 and 4.) The fork L is provided with a tail, $L'$, which slides in a bracket, $L^2$, fixed upon the stand A, the fork being held in position by set-screws $L^3$ and lock-nut $L^4$, as shown in Figs. 5 and 6. The tail $J'$ of the fork J passes through a long boss, $J^2$, on the end of the arm or bracket $J^3$, and is held by set-screw $J^4$ and lock-nut $J^5$, as shown in Figs. 1, 2, 3, 5, 6, and 7.

In order to accommodate logs of various depths, and that it may be out of way when the circular saw is in action, the arm J³, and with it the fork J, is made adjustable vertically, as follows: The end of J³ farthest from J is formed into a long boss, J⁶, which works upon an upright shaft, M, and is prevented from turning upon it by the key m, which is fixed rigidly in boss J⁶, but slides freely in the long key-bed in shaft M, as shown in Fig. 7. The arm J³, when adjusted, is held in position by the set-screw J⁷. The bottom of shaft M passes a little way into the base-plate of standard A, and the top end is held firmly by the bracket M', which is bolted to standard A, as shown in Figs. 1, 2, 5, and 6. On the back of J⁶ is a projection, J⁸, in which the screwed spindle M² works. The bottom end of spindle M² passes into standard A, and the top end, passing through bracket M', is fitted with a toothed wheel, m², the upward thrust being taken up by the collar m³. (Shown in Fig. 6.) Gearing onto m² is a toothed wheel, m⁴, which is keyed onto the spindle m⁵, also carried by bracket M' and worked by the hand-wheel m⁶. To raise and lower arm J³ it is only necessary to loosen set-screw J⁷ and turn the hand-wheel m⁶ in the required direction, motion being conveyed from it through spindle m⁵, gears m⁴ and m², and screw-shaft M² to j⁸. In order to secure greater steadiness in arm J³, the rod N is added, one end of it being pivoted to J³ at n, and the other end working on the pin n', as in Figs. 5 and 7. This pin forms part of a small bracket, n², bolted firmly to A. The end n³ of the rod N is formed with a long slot, n⁴, Fig. 8, to allow for the varying length of rod N, due to the vertical movement of the guide-arm J³.

The fence or gage E is intended to answer as a guide for sawing timber of various thicknesses, and is used for both the band and circular saw. Its distance from the saw is regulated by the screw E', lying at right angles to the rack-bench and carried in bearings e e, Figs. 3 and 4. Screw E' is actuated by the handle e', located outside of the rack-bench, and passes through a long nut, e², having a projecting arm, e³, Fig. 3, terminating in a long boss, e⁴, lying at right angles to e², as shown in Fig. 4. The fence E is also provided with a similar boss, e⁵, and through these bosses there passes a short shaft or rod, E², which is secured within the bosses e⁴ and e⁵ by the set-screws e⁶ and e⁷. By means of this rod E² the position of gage E in a line parallel to the rack-bench may be altered considerably, and, if required, by simply slacking screw e⁶ the fence E may be removed altogether.

To carry the weight of gage E and to enable it to be adjusted with more freedom, a small wheel, e⁸, Fig. 6, is mounted on a downward-projecting arm, e⁹, of the fence. This wheel runs on the platform B. For the purpose of enabling the band-saw to be shipped or unshipped, a portion, B', Fig. 7, of the platform B is made loose, and is supported when the saw is in action by two swinging brackets, b b, Figs. 3 and 4. In these figures the portion B' is removed.

We claim as our invention—

1. In a saw-mill, the combination, with a fixed frame-work, of band-wheels H I, mounted therein and adapted to carry a band-saw, arbor C', adapted to carry a circular saw in the same vertical plane as the band-saw, and a log-carriage movable upon or past the frame-work, substantially as and for the purpose described.

2. In a saw-mill, the combination, substantially as set forth, of a reciprocating log-carriage, a supporting frame-work at one side of said carriage, a circular-saw-driving mechanism and a band-saw-driving mechanism mounted on said frame-work in a manner substantially as set forth, whereby the saws driven by said mechanisms will operate in a common vertical plane lying between said carriage and the said frame-work.

3. In a band-saw mill, in combination with a main frame and a vertically-adjustable plate, A², mounted thereon, a plate, h, carrying the upper saw-supporting wheel and pivoted to the face of the plate A² by means of a bolt, h², and provided with curved slots h⁹, and swiveled nut h⁵, bolts h⁸, secured to plate A² and engaging the slots h⁹, a block or stud, h⁶, swiveled in the plate A², and a screw-stem, h⁴, journaled in the stud or block h⁶, and engaging with the nut h⁵, substantially as described.

4. In a band-saw mill, in combination with a main frame and a bar or rod, M, secured thereto or formed thereupon, an arm, J³, mounted and free to slide thereupon, a device, substantially such as shown, for raising and lowering the arm, a saw-guide carried by the arm, and a brace, N, extending from the main frame to the outer end of the arm J³, substantially as and for the purpose set forth.

5. In a band-saw mill, in combination with a frame, the vertical guide-rod M, the screw-stem M², spindle m⁵, and gears m² and m⁴, arranged and operating substantially as shown and described, the arm J³, mounted upon the rod M and provided with a socket, J², at its outer end, a saw-guide, J, provided with a stem, J', to fit within the socket J², and a set-screw, J⁴, or similar device for locking the guide in place.

6. In a saw-mill, in combination with a bed or table, a screw-shaft, E', journaled therein, a block or nut, e², mounted upon the screw-shaft and carrying a socket, e⁴, at right angles to the shaft, a fence or guide, E, provided with a stem or rod, E², adjustable within the socket e⁴, as and for the purpose set forth.

7. In a saw-mill, in combination with a bed or table, a shaft, E', journaled therein, a block, e², mounted upon the shaft, a socket, e⁴, carried by said block at right angles to the shaft, a fence or guide, E, provided with a socket, e⁵, on its rear face, and a stem or rod passing through the sockets $e^4$ and $e^5$ and adjustably secured therein.

8. In a saw-mill, in combination with a bed or table, a screw-shaft, E', journaled therein, a block, $e^2$, mounted upon the shaft, an upright fence or guide carried by said block and provided with rollers $e^8$ $e^8$ in its lower edge.

In testimony whereof we have signed our names to this specification in the presence of two subscribing witnesses.

EDWARD W. TURNER.
    JABEZ REYNOLDS.

Witnesses:
 EDWARD TURTON CRESSWELL,
 WALTER SYDNEY PHILLIPS.